Oct. 8, 1963

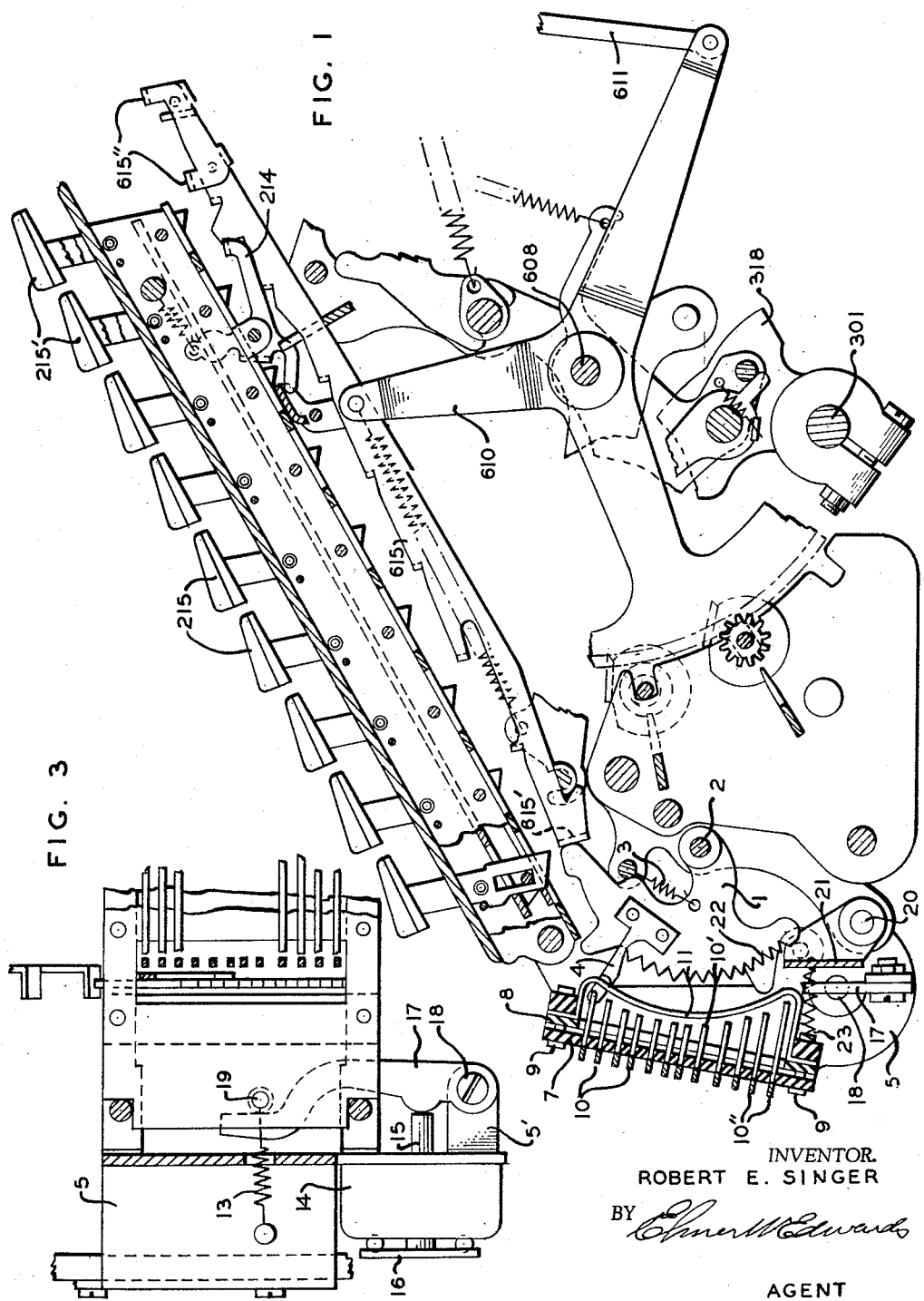

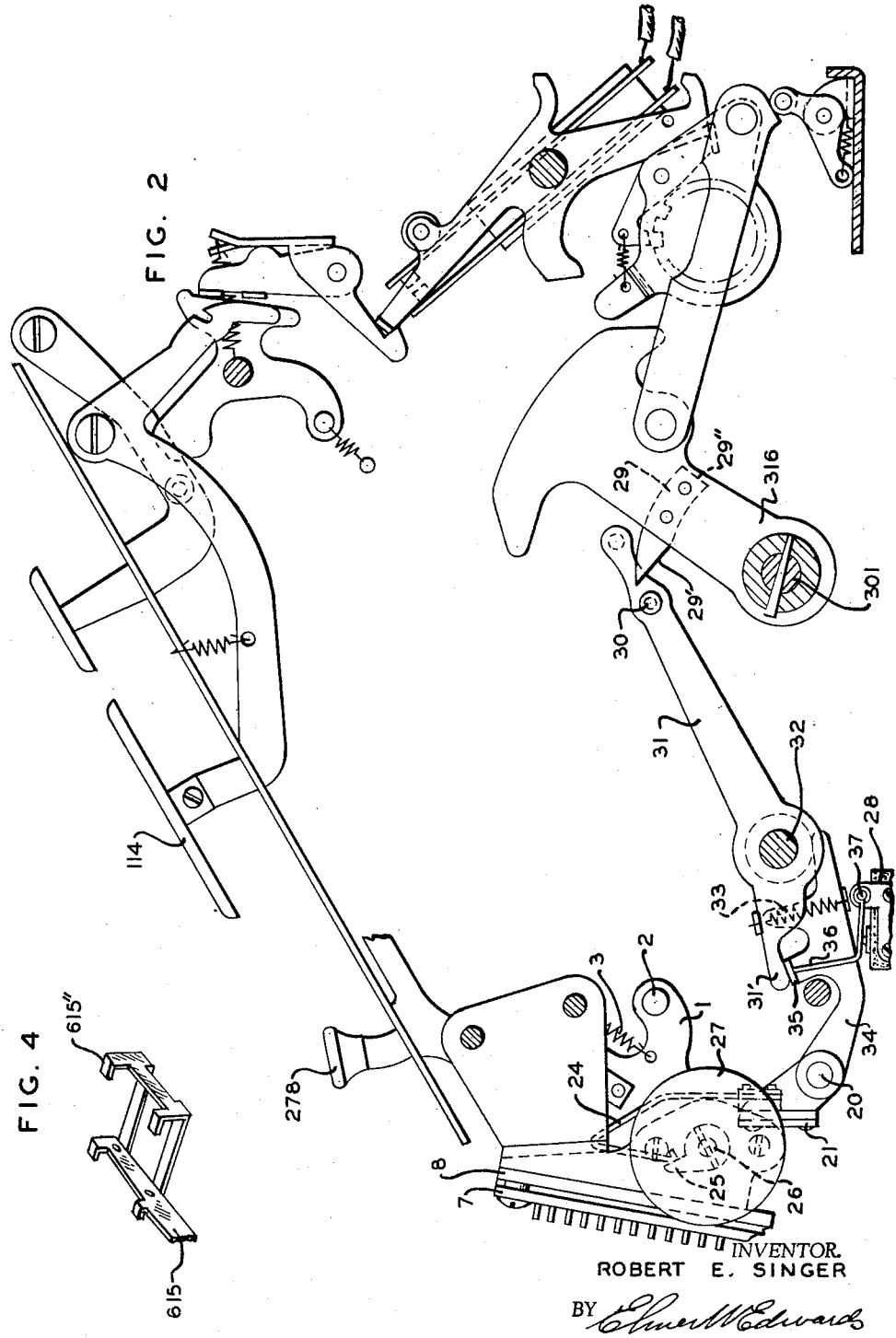

R. E. SINGER ETAL 3,106,338

CONTROL FOR DATA PROCESSING

Filed Sept. 28, 1959

INVENTOR.
ROBERT E. SINGER

BY

AGENT

INVENTOR.
ROBERT E. SINGER

United States Patent Office 3,106,338
Patented Oct. 8, 1963

3,106,338
CONTROL FOR DATA PROCESSING
Robert E. Singer, Bernards Township, Somerset County,
N.J., assignor to Monroe Calculating Machine Company, Orange, N.J., a corporation of Delaware
Filed Sept. 28, 1961, Ser. No. 143,011
10 Claims. (Cl. 234—58)

This invention relates to accounting and calculating machines and data processing apparatus in general, having a set of actuators arranged in denominational orders and differentially movable to represent a multiorder amount and concerns means for sequentially reading out values from such a machine for the purpose of controlling tape punching apparatus and the like.

In conventional readout devices for such machines the denominational orders thereof are usually read out in successive manner as by means of a sequence switch, so that for each order a unitary electrical impulse is directed over selected circuit lines, each such circuit corresponding to the particular value setting of the respective order actuator.

Certain systems of notation however, such as the sterling currency system, include a multidigit base value so that for the lower order actuator member in such case operation is extended to include a ten and an eleven step movement thereof whereby to accommodate selective positions thereof corresponding to the eleven and twelve pence values.

For said added positions novel readout means are provided herein whereby the usual single output impulse signal effected with respect to a readout of any selected single order will for any multidigit value of said order program have a plurality of output code signals each being thereupon translated into related coded impulse signals as may be utilized in effecting coded tape punching operations and the like.

A principal object of the invention therefore is to provide an improved readout means which will read out from a given order of such machines selected multidigit values and which readout means embody program devices whereby any single output signal representing a multidigit value may be converted to a plurality of output signals each thereafter being translated into the usual coded impulse signals for the operation of tape punching devices or the like.

Further objects, features and advantages of the invention will become apparent from the following detailed description of a preferred embodiment thereof taken in conjunction with the accompanying drawings wherein:

FIG. 1 is a right side sectional elevation taken immediately to the right of the lower order accumulator wheel actuator for an accounting machine.

FIG. 2 is a right end elevation of the cyclic clutch means for the accounting machine and control means therefor.

FIG. 3 is a fragmentary front elevation view of a portion of the switchboard devices, showing means for operating the switchboard frame.

FIG. 4 is a detail perspective of a portion of the differential stop bar associated with the lower order actuator means for controlling pence value registrations.

Figure 5:
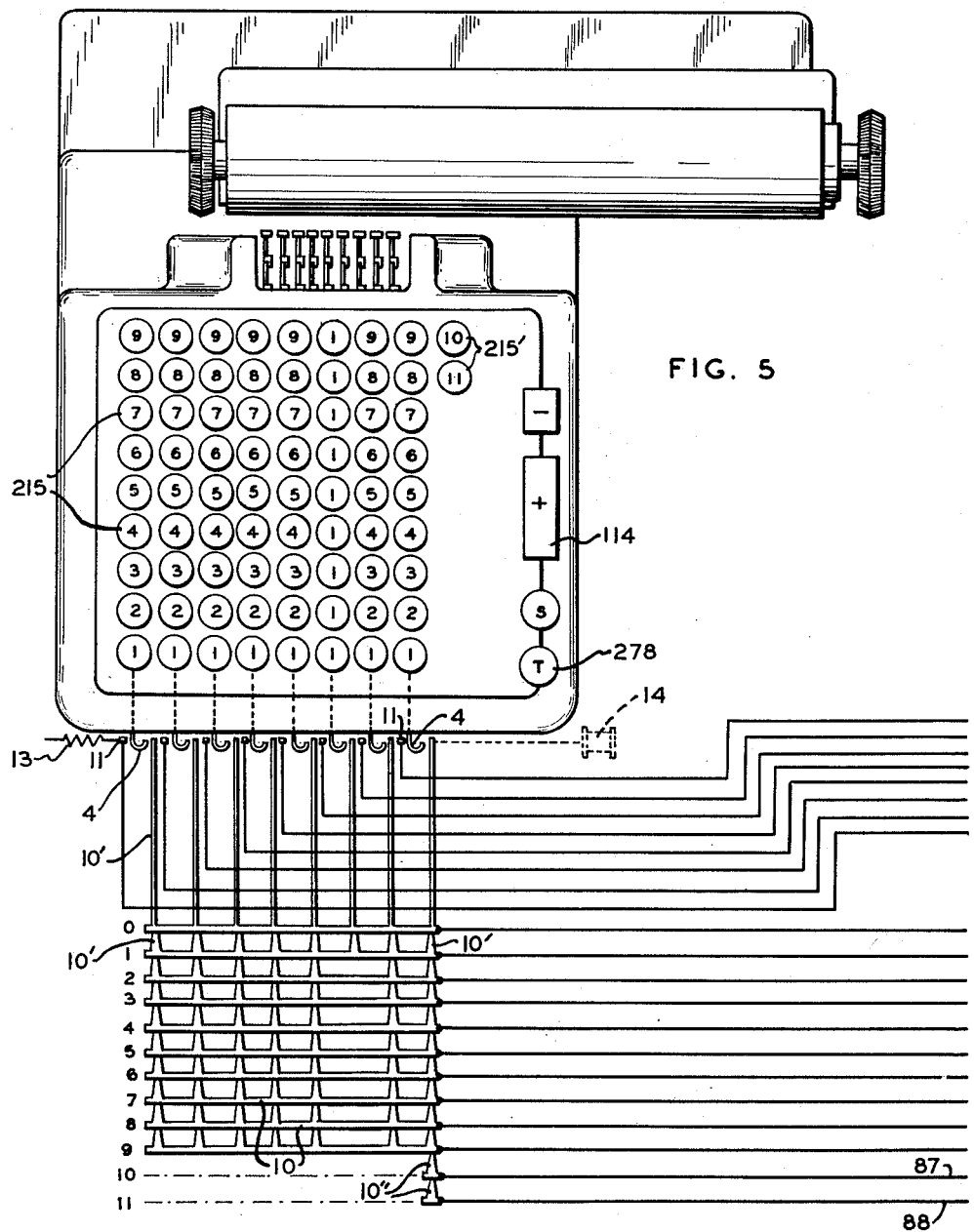
FIGS. 5 and 5a show a schematic diagram involving the circuits of the invention described herein.

The present invention contemplates an improved readout device and is shown for convenience in connection with an electromechanical readout device such as that disclosed in U.S. Patent No. 2,983,440 issued May 9, 1961 to Nathaniel B. Wales, Jr., to which reference is made for details of construction and operation not deemed necessary to be described herein.

Referring now to FIG. 1 for each denominational order the machine is provided with a three-armed differential actuator lever 610, loosely mounted on a shaft 608. The forward arm of each said lever terminates in a sequential registering rack; the rearward arm has a lister type bar 611 pivoted thereto and the upper arm has pivotal connection with a differential stop bar 615 cooperating with a bank of digit keys 215 to limit a movement of the actuator lever 610 in the corresponding column for selectively registering digit values 1 to 9, suitable column stops 214 being provided for zero registrations. Adjacent the lower order column of said keys 215, however, there is provided herein two keys 215' which cooperate with suitable offset projections 615" of the lower order stop bar 615 whereby movement of the right-hand actuator rack 610 may be controlled for eleven steps of selective movements in accordance with the pence values of the sterling currency system, the lower order accumulator wheel of course being provided with twelve teeth in lieu of the usual ten teeth required for the decimal system of notation.

As is well known, values entered through the keyboard or totalized from the accumulator wheels of the computer are represented by the forward extent of movement permitted to the differential stop bars 615 and racks 610 during an operation of the machine, machine operation being effected by suitable control keys 114 and 278, as in well-known manner.

As more fully set forth in the above patent, No. 2,983,440, values as entered upon or totalized from the accumulator wheels of the computer and represented by the forward extent of movement permitted bars 615, and racks 610 are translated into perforations of a record tape through the reading out of said values from the computer in sequential manner from a higher to lower denominational order. So that such successive readout operations may be completed without interrupting a cyclic operation of the computer or otherwise delaying restoration of the stop bars 615 and racks 610, suitable storage or memory sectors 1 related to each of the bars 615 are provided, which are displaceable in accordance with a forward movement of its corresponding stop bar 615 and thereafter locked in set position.

Storage sectors 1 are loosely mounted upon a transverse shaft 2 of the computer and yieldably held by means of individual springs 3 in a clockwise raised position for engagement by the projection 615' formed on the forward end of the stop bars 615. Mounted upon each of the sectors 1 and electrically insulated therefrom is a contact wiper 4 and during a forward movement of bars 615 sectors 1 are caused to be rotated counterclockwise about shaft 2 to a position corresponding to the value represented by a displacement of the bars 615. This will position said wipers adjacent to corresponding value contact pins 10' of the related order, pins 10' being secured within a stationary frame 7 of switchboard devices hereinafter to be described.

Switchboard frame 7 is suitably secured to the left and right end plates respectively of the machine and is formed of a molded dielectric material in which are mounted ten electrical conducting comb bars 10 in superposed levels, said bars corresponding to the digit values 1–9 and 0, as illustrated in FIG. 1. Each of the bars 10 has a plurality of rearwardly projecting contact elements 10', there being a contact 10' for each denominational order provided in the machine. In addition to such bars 10 there is now provided in the said stationary frame 7 two additional contact elements 10". The latter said contacts are similar to the contacts 10' and arranged for cooperation with the contact wiper 4 of the lower order sector 1 upon selected setting of said sector corresponding to the eleven or twelve pence value positions, in the manner and purpose as hereinafter to be described. Contact elements 10′, 10″ extend rearwardly within the arc transcribed by the value settings of the related contact wipers 4 but are positioned slightly to the right of wipers 4 so that said wipers are adjusted to a value setting position without engagement with contacts 10′, 10″.

Slidably supported between upper and lower guide studs 9 secured within the fixed frame 7 of the switchboard is a shiftable frame 8. Related to each contact wiper 4 there is mounted upon the shiftable frame 8 an elongated contact control bar 11 which is formed as an arc within the radius of wipers 4 about pivot shaft 2. Frame 8 is biased toward the left by spring means 13 (FIG. 3) so that bars 11 are held leftward out of frictional engagement of contact wipers 4 while said wipers are being adjusted to value set position. Following adjustment of wipers 4, however, frame 8 will be shifted toward the right, in the manner and for the purpose as will now be described.

Secured to the bracket 5 on the left-hand side framing of the machine is a magnetically operated solenoid 14. A plunger 15, forming part of the armature 16 of said solenoid, has engagement with an upwardly extending lever 17, pivotally mounted at 18 upon an ear 5′ of the bracket 5. The upper end of lever 17 has engagement with a stud 19 fast within the shiftable frame 8 of the switchboard devices and upon energization of solenoid 14, as hereinafter described, armature 16 and plunger 15 will be moved to the right (FIG. 3) and impart a clockwise movement to lever 17. Clockwise movement of lever 17 through stud 19 will act to displace panel 8 of the switchboard devices toward the right and all of the ordinal contact bars 11 are carried thereby into engagement with their related denominational order contact wipers 4. The above described operation of bars 11 act not only to extend electrical circuits from said bars 11 to the related wipers 4 but will act also to effect a lateral displacement of the wipers 4, whereby said wipers are brought into engagement with any selected contacts 10′, 10″ in accordance with the value displacement of said wipers by the respective stop bars 615, earlier described.

It is recalled that values stored within memory sectors 1 are to be read out of said sectors in a sequential manner and that it is desirable to have the actuator stop bars 615 free to return to their normal retracted positions to avoid the necessity of interrupting or holding up operation of the cyclic devices of the computer during nontape perforating operations thereof but will continue in a locked condition in tape perforating control operations until released by completion of an operation of the readout devices, which operation occurs coincident with a return movement of stop bars 615 and may not be completed until after the completion of a cyclic operation of the computer.

Loosely mounted upon the right and left end portions of a cross shaft 20 of the machine is a locking bail 21 extending transversely of memory sectors 1 and normally held through spring means 23 out of engagement with suitable serrations 22 formed on the forward edge of memory sectors 1, there being ten of such serrations on the sectors related to the higher orders of the machine and twelve serrations on the sector related to the extreme right-hand or "pence" column of the machine. Fast to bail 21, near the right-hand end thereof, is an upwardly extending spring tempered arm 24 having the upper end portion bent downwardly in a position rearward of an operating arm 25. Arm 25 is secured to a shaft 26 forming the plunger of a well-known rotary type solenoid 27. In an energizing of solenoid 27 shaft 26 is caused thereby to be rotated in a clockwise direction, as viewed in FIG. 2. During a clockwise operation of shaft 26 arm 25 engages spring arm 24 and will rock locking bail 21 clockwise into engagement with the serrated edges 22 of memory sectors 1 locking said sectors in value adjusted position against tension of their respective springs 3 until said bail 21 is caused to be released by a deenergizing of solenoid 27, as hereinafter described.

Placed in the circuit means for solenoid 27 and in parallel circuit with the solenoid 14, for displacing frame 8 of the switchboard devices earlier described, is a snap switch 28 which is adapted for operation by the cyclic devices to cause energizing of solenoids 14 and 27, as follows.

Secured to arm 316 of operating shaft 301 is a double faced cam block 29 the cam surface 29′ of which is adapted in a forward movement of arm 316 to engage with roller 30 on the rearward arm of a lever 31, fulcrumed upon transverse shaft 32, and impart a clockwise movement to said lever. Lever 31 has yieldable spring connection 33 with a rearwardly extending lever 34, loosely mounted upon the shaft 20. In the above-described clockwise movement of lever 31 cam block 29 thereafter moves above roller 30 and near the end of the forward stroke of arm 316 said cam is carried beyond roller 30, whereupon spring 33 restores lever 31 counterclockwise and roller 30 is thereby positioned in the path of a cam surface 29″ for the return movement of cam block 29. A forward arm 31′ of lever 31 has engagement with a lug 35 of the lever 34 and during the first portion of a return movement of cam block 29 cam surface 29″ engages roller 30 to impart a counterclockwise movement to the lever 31, whereupon arm 31′ engaging lug 35 imparts a clockwise movement to the lever 34. Lug 35 overlies an arm 36 pivoted at 37 to the snap switch 28 and upon clockwise movement of lever 34 lug 35 rocks arm 36 downwardly closing switch 28 to thereby effect operation of the solenoid 27 for engaging locking bail 21 with memory sectors 1. At the same time closure of switch 28 will also effect an energizing of solenoid 14 to displace frame 8 rightwardly, thus engaging wipers 4 with any selected contacts 10′. Each of said contacts 10′ has circuit connection to the usual coding plugboard means so that upon a sequential order readout operation any single digit values 1 to 9 and 0 represented upon the respective sectors 1 and wipers 4 are caused to be translated into coded electrical circuits for operating suitable tape punch means as in the known manner fully set forth in reference patent, No. 2,983,440. In the event, however, that the lowest order sector 1 has been set to the elevent or twelve pence value position, the rightward displacement of the wiper 4 thereon will bring said wiper into engagement with the corresponding pence value pin 10″. Special control devices associated with the latter said pins are provided herein for programming a plurality of output code signals from the single initial output signal effected for said machine order column during the readout operation, as will be more fully described hereinafter in connection with a description of the wiring circuit associated therewith (FIGS. 5—5A).

It will be noted that in the above-described operation cam surface 29″ engages roller 30 early in a return stroke of the machine cycle to effect engagement of locking bail 21 with memory sectors 1 before a suitable cam 318 (FIG. 1) of the cyclic devices starts return movement of the actuator stop bars 615 in the well-known manner. Also that during a return operation cam block 29 will pass beneath roller 30 and hold lever 31 in raised position, until near the end of an operation of the cyclic devices when cam block 29 is carried free of roller 30. Thus solenoids 27 and 14 will remain energized to maintain locking engagement of bail 21 with memory sectors 1 and circuit engagement of wipers 4 with contacts 10′, 10″ throughout a return operation of the cyclic devices. Upon release of roller 30 from cam block 29 spring 33 will act to restore levers 31 and 34 and thereby normally disengage circuit switch 28, thus deenergizing solenoids 27 and 14 and allowing the parts to return to normal. As previously stated, however, in a tape perforating control operation values are read out of memory sectors 1 in a sequential manner to effect successive corresponding operations to the tape perforating devices. It may occur therefore that switch 28 would be disengaged by the cyclic devices of the computer prior to the completion of a tape perforating sequence readout operation and for this reason suitable holding circuits for solenoids 14 and 27 are provided, whereby said solenoids will remain energized until a readout has been completed, as will be described.

Machines of the character to which the present invention is related are usually provided with a shiftable record carriage for supporting work sheets upon which posting entries may be made in the successive columns thereon according to the particular work requirement, such as the passbook posting journal routine described in relation to the devices of the U.S. Patent No. 2,983,440. However, the present invention need not be dependent upon the record carriage position, and such associated circuits as are controlled by the carriage in connection with a program series of operations form no part of the present invention. Therefore, the circuit means herein will be described as relates to a machine operation independent of the position of the carriage. It will become obvious, however, as the description proceeds, that the added means are susceptible to being readily incorporated within the earlier disclosed carriage controlled circuits.

Figure 5A:
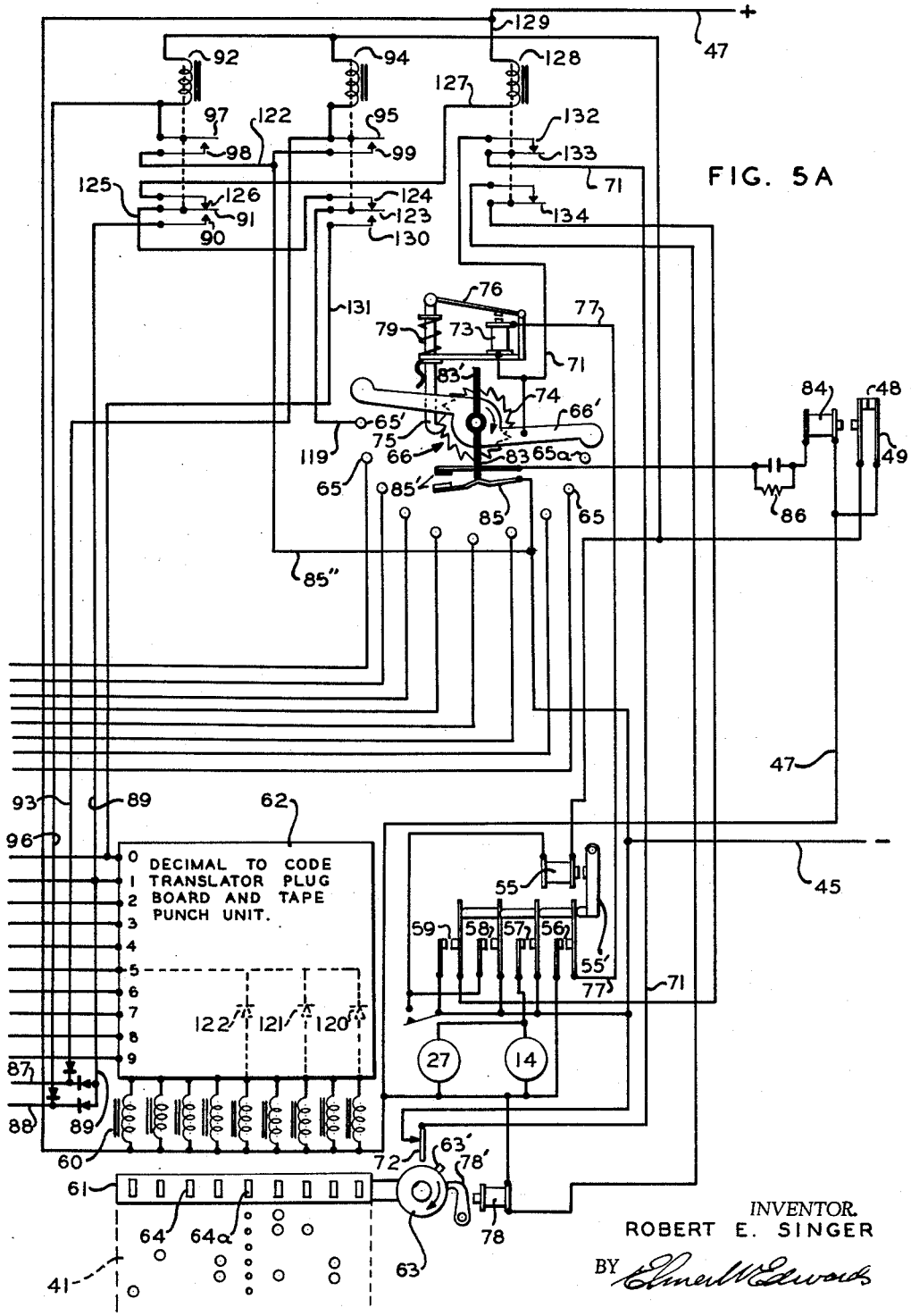

Let it now be assumed that upon the conventional sterling currency keyboard of FIG. 5 an amount of £7, 15s, and 6d is set up on the keys 215—215' and the motor bar 114 thereafter depressed to start a machine cycle of operation. During a resultant forward operation of the cyclic devices the stop bars 615 (FIG. 1) related to the first four righthand columns will effect a corresponding value displacement of the related memory sectors 1. Thus contact wipers 4 related to the pence, the right and left row shillings columns, and the lower order pounds column will be positioned opposite related order contacts 10″, 10′ in the seventh, sixth, second and eighth levels (reading from top to bottom) respectively of the comb bars 10, while all wipers 4 to the left will remain in position opposite their zero contact members 10′ of the first level comb bar 10.

It will be recalled that following a value adjustment of the memory sectors 1 a snap switch 28 is caused to be closed in the operation of the cyclic devices, as earlier set forth with respect to the devices shown in FIG. 2. Upon closure of snap switch 28 a circuit is extended from a negative source line 45 (FIG. 5) through said closed switch to the negative pole of a relay member 55, the opposite pole of which relay extends to a plus terminal lead 47 through the normally closed contacts 48 of a relay controlled switch 49 to be hereinafter described. Upon the described closure of switch 28 therefore, relay 55 becomes energized and will attract armature 55' to effect closing of a group of contact switches 56, 57, 58, and 59 associated with said relay.

Upon closure of the contact switch 57 of said group, terminal ground circuit 45 is now extended through said switch to the negative pole of the solenoids 14 and 27, earlier described, and the opposite poles thereof being connected directly to plus lead 47 both of said solenoids are caused to be energized at this time. Energizing of solenoid 27 will effect an operation of the bail 21 (FIG. 2) into engagement with memory sectors 1 to lock said sectors into value set position. At the same time solenoid 14 (FIG. 3) effects a rightward movement to the switchboard frame 3 so that contact bars 11 of frame 3 will engage the related denominational order wipers 4 and rock said wipers into engagement with the related order value contacts 10', 10″ of the selected value comb bar 10, as in the manner above described.

Comb bars 10 with contacts 10″ for the right-hand or pence value column represent the digit values 0 and 1 to 11 and, with the exception of the higher order shilling column which is limited to a zero or a one setting, for all the remaining columns will represent the digit values 0 and 1 to 9 as for the decimal system.

As for the devices of the reference patent, No. 2,983,440, the comb bars 10 related herein to the 0 and 1–9 digit values are suitably connected to coded punch selection magnets 60 (FIG. 5a) of a well-known tape perforating unit 61 through means of the usual code translating plugboard 62 of known design associated with such tape perforating means. A typical example of the manner in which this plugboard is wired is shown in connection with the decimal 5 input lead. A signal on this lead is arranged to energize the punch magnets corresponding to the 1, 4 and "feed hole" channels of the punch 61 by means of diodes 120, 121, and 122 respectively. It will be sufficient to say that upon release of a suitable clutch member 63, a cyclic operation of the punch unit effects coded perforations in the usual tape means 41 in accordance with the selective combination of coded operations of the control magnets 60.

Alternative to the motor driven clutch type of punch illustrated, it is evident that a punch having a direct magnet punch drive in conjunction with a magnet driven transport device and a self-cycling switch means would be equally suitable and operative with the subject invention.

Contact bars 11 (FIGS. 1 and 5) of switch panel 8 are connected by electrical circuit wiring directly to related contact members 65 (FIG. 5a) of a sequence circuit switch member 66. A rotatable contact wiper 66' of sequence switch 66, when in normal position illustrated in FIG. 5a, is free of engagement with any of the contact pins 65 and is adapted in a clockwise indexing operation to engage said pins in the manner and purpose to be described. Wiper 66' is in continuous engagement with circuit lead 71, which extends to terminal ground line 45 through normally closed contacts 132 of a relay 128, and thence through the normally closed contacts of a switch member 72 in series circuit with contacts 132.

Wiper 66' of sequence switch 66 is fast with a ratchet wheel 74 operable in step by step manner through means of a pawl 75 secured to the armature 76 of a relay magnet 73 adapted for effecting operations of said switch as follows. The negative side of magnet 73 is connected to lead 71 extending to terminal ground lead 45, as above described. Positive side of magnet 73 is extended to terminal plus lead 47 by means of a circuit lead 77 and the switch 56, adapted to be closed by relay 55 in an operation of switch 28 by cyclic operation of the computer, as in the manner earlier described. Therefore, upon a closure of switch 28 magnet 73 is energized and armature 76 will adjust pawl 75 one tooth preparatory to advancing ratchet wheel 74.

As earlier stated a perforating operation of the tape punch unit is effected through the release of a cyclic clutch member 63 and said clutch will be released by means of an electromagnet 78 controlled as follows.

One side of magnet 78 has connection directly to the terminal plus lead 47 while the opposite side of said magnet is connected to the switch member 59 through normally closed contacts 134 of relay 128 to be described. Switch member 59 it will be recalled is closed by armature 55' of relay 55 when snap switch 28 is operated following the forward stroke movement of the computer devices. Closure of switch 59 acts to complete a circuit to magnet 78 and said magnet attracting armature 78' will release clutch 63 and start a cyclic operation of the tape perforating unit. It will be observed that such starting operation coincides with the start of a return stroke movement of the computer devices so that the tape perforating means will be operated in unison with the computer during said return movement. At the completion of a computer cycle of operation switch 28 will be restored as earlier described. However, special means to be described are provided for maintaining continuous operations of clutch 63 and for thereafter terminating operations of the perforating devices after a readout operation is completed.

In each cycle of operation of punch clutch 63 a suitable pin 63' operable therewith acts to effect an opening and closing of contact switch 72 for momentarily interrupting ground circuit to magnet 73 and the wiper 66'. At the end of each cycle of operation of the tape perforating unit therefore magnet 73 is caused to be deenergized and permits pawl 75 under influence of spring means 79 to advance ratchet wheel 74 and wiper 66' one step of clockwise movement, while reengagement of contact switch 72 with consequent reenergizing of magnet 73 serves to again condition pawl 75 for a further indexing operation.

It will be apparent therefore that sequence switch 66 is operated in timed sequence with tape perforating operations and will act to extend ground circuit from lead 71 to the pins 65 in successive order, and thereafter to a special pin 65' adapted to the purpose hereinafter to be described.

During each operation of the punch unit a punch member, indicated at 64a, is caused to be operated and effect feed perforations within tape 41, whereby said tape engages suitable sprocket means which advance the tape in the usual and well-known manner.

The first of the series of pins 65 engageable by switch arm 66' is identified by the suffix $a$ and since said pin controls means not necessary to be described with respect to the present disclosure it will be sufficient to say that at the conclusion of an operation pertaining to said contact pin 65a switch 66' will be indexed to the first succeeding pin 65 proper. Each of the pins 65 has suitable lead connection 81 with a corresponding one of the denominational order contact bars 11 which as earlier described have been simultaneously displaced toward the right for the purpose of engaging wipers 4 with selected contacts 10' of the comb bars 10 in accordance with a displacement of the related storage sectors 1.

It is apparent therefore from the above description and circuit diagram that during continued cycles of operation of the punch clutch means 63 sequence switch wiper 66' will be indexed each cycle of operation to extend ground circuit successively to bars 11 from higher to lower denominational order, and memory sectors 1 will act to extend said circuit through the selected levels of comb bars 10 and thence by suitable circuit lines to the decimal to code translator plugboard wherein punch selection magnets 60 are energized to control successive coded perforations of the tape 41 in accordance therewith.

Under high operating speeds or increased capacity, it is possible that the cam means 29 (FIG. 2) of the listing calculator may act to restore switch means 28 to open condition before a scanning cycle of sequence switch 66 is completed. Special means therefore are provided whereby circuits established by switch 28 will be maintained in effective condition until released under control of sequence switch 66. This is accomplished, as set forth in reference Patent 2,983,440, by means of the switch member 58, closed upon operation of relay 55 in the engagement of switch 28, earlier described. Said switch is adapted to extend a locking ground circuit to relay 55 from terminal ground lead 45, suitable lead line and switch 58 and thence to the said relay magnet 55, so that relay magnet 55 remains energized to maintain all circuits initiated through means of switch 28 in effective condition, until said magnet is released, in the manner to be described.

It will be recalled that plus circuit from lead 47 extends to relay magnet 55 through the normally closed contacts 48 of the switch member 49. Switch 49 is adapted for momentary operation at the end of a scanning operation of sequence switch 66, completed upon each 180° of revolution of the contact wiper arm 66'. Contact operating means 83, 83' rotatable with said switch are provided to effect control of circuit means of a relay magnet 84 to cause operations of switch 49 as follows.

In the normal open circuit position of arm 66' of sequence switch 66 one of the arms 83, 83' is in engagement with a switch member 85 and will hold contacts 85' of said switch in open condition. One arm of switch 85 has circuit line connection 85" directly to terminal ground lead 45 while the other contact arm thereof has circuit line connection to relay magnet 84 through adaptation of well-known pulse type circuit condenser means numbered 86 on the drawings. Relay magnet 84 is connected from plus side directly to plus terminal lead 47 and following an initial operation of sequence switch 66 arm 83 releases contact 85' to close the circuit and charge pulse means 86. At the conclusion of a scanning cycle of operation of switch 66 the opposite of the arms 83—83' then engages switch 85 to reopen contacts 85' and thus discharge the pulse means 86 which thereby acts to effect a momentary opening and closing of the plus circuit switch 49. Said momentary operation of the switch member 49 is adapted to open plus circuit from terminal lead 47 to the relay member 55 for sufficient time for said member to release the armature 55' thereof, whereby switches 56 to 59 earlier described will be restored to normal setting and all circuits are again at normal condition and concluding the operation.

The devices of the heretofore known art and as above set forth are adapted to a readout of denominational order amounts in which each column is limited to unitary digit values, such as values representing 0 and 1 to 9 of the decimal system of notation.

*Readout Control for Sterling Currency System*

For effecting coded translations with respect to a selective readout signal related to a column in which multi-digit values, such as the ten and eleven pence values of the sterling currency system, are set up on a single storage sector 1 in accordance with the selection of a key 215', special means are herein provided whereby the related unitary output signals corresponding to the respective readout of the value ten or eleven are each translated into the form of two successive output signals. For either said values the first of said signals will be directed to controlling the punching devices for effecting coded tape perforations corresponding to the digit value one. Thereafter a second signal will be directed selectively to the control of the punch devices for effecting coded tape perforations corresponding to a zero with respect to the ten pence value or to the digit value one with respect to the eleven pence value, as will now be described with relation to certain relay devices and control circuits operable in conjunction with the above described wiring diagram of FIGS. 5–5a.

As earlier described the right-hand control column of the switchboard devices herein include two added contact members 10", one relating to the ten and the other to the eleven pence value setting of the corresponding storage sector 1 with wiper 4. Thus upon a rightward displacement of the switchboard wiper 4, in the manner previously described, an output signal for a ten or eleven value set up on the right-hand sector 1 may be effected selectively to a corresponding output value lead 87 or 88. Each of said leads has connection in common to a lead line 89 connected in turn to the particular circuit line which connects the comb bar 10 of the value one to the corresponding value input terminal of the usual translating to code plugboard 62. Lead 89 extends said circuit also to a contact member 90 normally free of engagement with a switch arm 91 operated by a relay means 92 associated with the output value eleven circuitry, as in the manner hereinafter to be described.

Lead 87 corresponding to the value ten output of the switchboard devices has connection by means of a lead line 93 to the negative pole of a relay member 94 and also to one side of a switch arm 95 adapted for operation by said relay. Both said relays 92 and 94 on the plus side are connected to the positive service line 47 which extends through the normally closed contacts of the end of cycle switch 49, earlier described. Relay 92 for the value eleven circuit is connected by means of a lead 96 to the value eleven output signal lead line 88. Said lead 96 has also connection with a switch arm 97 operable by the said relay 92. Switch arms 95 and 97 are each normally out of engagement with respective contact members 98 and 99, connected each by means of common lead 122 to the negative source line 45.

Also adapted for operation by the value ten relay 94 is a switch arm 123 connected by means of lead line 119 to a special pin 65' engageable by sequence switch 66', as in the manner and purpose hereinafter to be described. Switch arm 123 normally engages a contact 124 connected in series circuit, by means of lead 125, with the switch arm 91 controlled by the relay 92 of the value eleven circuit. Switch arm 91 normally engages a contact member 126 connected by means of a lead line 127 to the negative side of a relay member 128, the opposite side of which is connected by lead 129 to positive source line 47. Related also to the switch arm 123 of relay 94 is a contact member 130 normally out of engagement with said arm 123 and being connected by means of circuit lead 131 to the zero input terminal on the coding plugboard 62.

Thus from the above it will be observed that in a clockwise operation of sequence switch 66' for a readout operation, as in the manner heretofore described, said switch upon engaging the final one of the pins 65, which herein corresponds to the pence column to be read out of the machine, three possible variations to the output signal for controlling the code punch devices with respect to said column may occur.

(a) An impulse signal corresponding to any of the single digit values from zero to nine.

(b) An impulse signal for the multidigit value of ten which subsequently is translated for successive coding as a first digit value one signal to the coding means followed by a subsequent zero value signal to the coding means.

(c) An impulse signal for the multidigit value eleven which is translated for successive coding as a first digit value one signal to the coding means followed by a subsequent digit value one signal to the coding means.

It will be recalled that sequence switch 66 is indexed by spring means 79 upon the deenergizing of magnet 73 during each operation of the punch cycle means 63 incident to reading out the successive order columns of the machine and that cyclic operations of the punch means will continue to be effected until a movement of the sequence switch arm 83' to home position reopens the contact switch 85 controlling the end of cycle relay 84, which thereupon opens switch 48 in the plus circuit for the control relay 55 and said relay releases the related switches including negative side control switch 59 for clutch magnet 78.

When operating under the condition (a) stated above, it is desirable in the present devices that the punch cycle means, in order to eliminate an unwanted tape feed operation, terminate its operation following a completion of the punch cycle related to any single digit coding operation in respect to the pence column. The following special means are therefore provided.

It is recalled that next adjacent to the final pin 65 and which relates to the pence column there is provided herein a special pin 65'. Following the above final punching operation therefore wiper 66' of sequence switch 66 is displaced for engagement with said pin 65' whereby to extend ground circuit from said wiper to pin 65' and through lead 119 to the switch arm 123 of relay 94 and said arm being normally closed to contact 124 the circuit is continued through lead 125 to the switch arm 91 of relay 92 and said arm being normally closed continues said circuit over lead 127 to the "automatic stepping relay" 128 to which reference is made earlier in the specification. The opposite side of relay 128 being connected directly to the plus service line 47, said relay at this time is caused to be energized and will open the normally closed contacts 132 of a switch member 133 interposed in series circuit with the negative lead 71 to the sequence switch operating magnet 73. Thus circuit to said magnet is caused to be broken and spring 79 is free to adjust sequence switch 66 to the home position and out of engagement with contact member 65' and whereby the above circuits associated with said contact are again normalized.

As stated earlier, cyclic operations of the punch devices normally will continue until terminated by the reopening of the contact switch 85 controlling the end of cycle relay 84; however, where, as in the above type operations related to the conditions under the above heading (a), no further code tape punching is to be effected after an operation related to the final pin 65, special means are provided to terminate the cyclic operation of the tape punch devices as follows.

Interposed in series with the negative circuit lead for the punch clutch magnet 78 is a normally closed switch member 134 operable by the "automatic stepping relay" 128. Thus immediately upon the above described energizing of relay 128 in the engagement of sequence switch arm 66' with the special contact member 65' said relay will disengage also the contacts of switch 134 and thereby open the negative control side for the clutch control magnet 78. Thus during the above continued operation of the sequence switch 66 through means of the automatic stepping relay no tape perforations or tape transport operation is effected.

For the condition (b) stated above a pence value of ten as set up in a single column by the value ten key 215' is to be read out of the machine as a unitary impulse which thereafter is translated into successive impulse values of one and zero respectively, as in the following manner.

Engagement of wiper 4 on the pence column storage sector 1 with the appropriate contact pin 10'' during a lateral displacement of the switchboard devices incident to a machine cycle of operation, as in the manner earlier set forth, will extend a ground circuit from source line 45, the normally closed contacts of the switch member 72 (tripped during each cyclic operation of the punch operating means) lead 71 including the normally closed contacts of the switch 133 therein to the wiper arm 66' of the sequence switch 66, and subsequently as said wiper in reading out the higher order columns to the final pin 65 whereby means of the related circuit lead therefrom to the switchboard devices an impulse is thus transmitted to the output lead 87 connected to the value ten contact 10'' engaged by the pence column wiper 4. From output lead 87 an impulse is thus extended over lead 89 to the value one input terminal of the code translator plugboard 62 and at the same time over lead 93 to the negative side of relay 94, earlier described. Relay 94 is thus immediately energized and will effect an operation of the switch arms 99 and 123 associated therewith whereby arm 95 will engage contact 99 to extend a holding circuit to said relay from negative lead 45 and at the same time switch arm 123 is disengaged from contact 124 and engaged with the contact 130.

It will be recalled that coincident with a shifting operation of the switchboard devices during a machine cycle of operation the clutch means 78 is tripped for effecting operation of the punch cycle means 63, which with sequence switch arm 66' assumed now to be in engagement with the final one of the pins numbered 65 will now effect a coded perforation upon tape 41 representing the value one related to the value ten pence in accordance with the input signal to the value one terminal of plugboard 62 above set forth. It is also recalled that in each operation of the punch devices a switch arm 72 is momentarily tripped to permit an indexing operation of sequence switch 66 by its spring motor 79. Thus following the above perforating operation the sequence switch wiper arm 66' is caused to be indexed free of the pin 65 and into engagement with the special pin 65' to which reference was made earlier in the specification. At this time therefore negative control circuit from said wiper is released from pin 65 and so breaks the described control circuit with respect to the value one input terminal for the plugboard translator means 62. At the same time negative circuit from wiper 66' is now effected to the pin 65' and thence over lead 119 the switch arm 123 now closed to the contact 130 and so by means of lead 131 to the zero input terminal of the plugboard translator 62. Thus, as the punch means continue in a cycle of operation subsequent to the coded punching operations for the first pence value one, coded perforations corresponding to the zero for the tens pence value are now caused to be punched upon tape 41, which tape is caused to be transported in each punching operation as in well-known manner.

It will be noted that since at this time a punching operation is required with respect to engagement of wiper arm 66' with special pin 65' the release of switch arm 123 from contact 124 has disabled circuit to the automatic stepping relay 128 so that operation of the indexing switch 66 remains under control of the punching cycle means 63 until terminated following the final punching operation when said switch in moving to home position free of contact 65' will cause opening of a switch member 85. It will be recalled that operation of switch 85 causes a momentary release of contacts 48 of an end of cycle switch 49. Contacts 48 being in the master plus control circuit 47 extended to the relay 94 will thus effect release of said relay and so permit switch arms 99 and 123 to restore to normal, concluding the operation. Where, as for the third condition stated (c), an eleven pence value is read out of the control machine the operation in such instance will be as follows.

Assuming contact wiper 4 of the pence storage sector 1 to be in engagement with the contact pin 10'' for the eleven pence value in lieu of the pin 10'' for the pence value ten above set forth, engagement of sequence switch arm 66' with the final contact pin 65 will now effect an output signal from the switchboard panel over lead 88 to the lead 89 and so to the value one input terminal and to the contact 90 of switch arm 91 controlled by the relay 92, as for the ten pence value above described. At this time, however, such impulse from lead 88 is transmitted also by means of the lead line 96 to the negative pole of the relay 92 related to the eleven pence value and will immediately energize said relay. Energizing of relay 92 will effect engagement of switch arm 98 with the related contact 97 for locking negative circuit to said relay, as in the manner and purpose set forth in relation to operation of the ten pence value relay 94. At the same time switch arm 91 operated by relay 92 moves out of engagement with contact 126 to disable circuit lead 127 controlling the automatic stepping relay 128, as for the purpose above described with respect to the ten pence value operation. Also, switch arm 91 is now engaged with the contact 90 which has connection over lead 89 to the value one terminal of the translator plugboard 62.

From the above it will be obvious therefore that coded punch control operations for the eleven pence value will be effected in similar manner to that described for the ten pence value with the exception that energizing of the eleven pence relay 92 will extend circuit from special contact pin 65' to the lead line 89 for a second input signal to the value one terminal of plugboard 62, whereas energizing of the relay 94 for the ten pence value controls transmitting of such second signal to the zero input terminal of said switchboard, as heretofore described.

There has been shown and described herein the fundamental novel features of the invention as applied to a single modification of means whereby a multidigit amount relating to a given order of the control machine may be read out therefrom in manner whereby to effect a plurality of successive control operations by which to obtain multicolumn type operations with respect to the controlled devices. It will be understood, however, that various omissions and substitutions and changes in the form and details of the device illustrated and in its operation may be made by those skilled in the art without departing from the spirit of the invention. It is therefore to be limited only as indicated by the scope of the following claims.

What is claimed is as follows:

1. In a data handling system; a denominational order series of registering devices each one of said devices movable selectively to different selected value positions representative of different items of information, means for recording the information registered in said registering devices in columns of a record member, means controlled by the selected value positions of each said registering devices for controlling operation of said recording means, said controlling means including selective unitary circuit output means for causing said recording means to record a selected single item of information standing in one order of said registering devices as two columns of value information on said record member, said two columns of value information jointly corresponding to said selected single item of information.

2. The combination according to claim 1; wherein each of said columns of said record member comprises a plurality of channels.

3. The combination according to claim 2, wherein said recording means comprises punching means.

4. In a data processing system; a series of columnar registering devices each one selectively settable to different value positions representative of different items of information, and wherein a selected one of said devices include items of information of compound value data significance, selective unitary impulse output circuit means for effecting a readout of any item of said selected order as a first unitary impulse signal, means controlled by said selected order registering device following a setting to a selected position corresponding to such compound value data to effect a secondary impulse signal, a recording device adapted to receive said first impulse signal whereby to record a first part of said compound value data in a given column and thereafter to receive said secondary impulse signal to record a succeeding portion of said compound value data upon a subsequent column of said recording device.

5. In an integrated data processing system; denominational order registering devices movable to different positions representative of selective values, and wherein at least a single order of said registering devices is adapted to be positioned for representing values greater than nine, means for recording values appearing upon said registering devices as columns of information upon a record device, means for reading out a selected value greater than nine as a unitary output signal from a single selected order of said registering devices, converting means for translating said unitary output signal to comprise a plurality of successive related output signals each corresponding to a given portion of said greater than nine readout value, and wherein each said portion of said value is recorded in separate columns of said recording means.

6. In an integrated data processing system; a control machine having a series of denominational order item storage members each movable to selective positions representative of different items of information, and wherein a selected one of said members is settable for storing items of information having compound data significance, readout means for effecting successive selective unitary output signals in accordance with the selected positions of each denominational order of said storage members, recording means adapted for receiving said readout signals whereby to record the information registered in said registering devices in columns of a record member each of said columns comprising a plurality of channels, control means responsive to a selective unitary output signal in a selected single order representing an item of compound data significance and adapted for determining a selected single control impulse to said recording means whereby to record a given portion of said compound data significance.

7. In a data processing system; a control machine having columns of storage members each including a single circuit element thereon movable to selective control positions representative of different items of information, and wherein for selected ones of said columns at least one of said positions includes an item of information having compound data significance, readout devices including a sequence switch for reading out the successive columns of said storage members and effecting successively an initial unitary output impulse signal according to the selected control position of the related circuit element for each respective one of said storage members, means for recording information stored on said members in columns of a record member each of said columns comprising a plurality of channels, selective control circuits extending any said initial output signal in accordance with the item representation position of said storage members to related item representation input terminals controlling the said recording means, and wherein each of said items of information is recorded upon succeeding columns of the record member, means operable during operations of said recording means to effect an operation of said sequence switch, auxiliary control devices operable by a selected one of said unitary initial output signals corresponding to a compound data item, a control circuit adapted in an operation of said auxiliary control means for effecting a second control impulse signal to a selected one of said input terminals and thereby record in a subsequent column of the record member a selected item of information for completing a representation of said compound data.

8. In an apparatus of the class described the combination comprising. a plurality of denominational columns of value storage members, and wherein one of said storage members is settable for representing in a single column values including zero to at least ten, sequence control means adapted for reading out successive columns of said storage members by effecting a selective unitary control signal with respect to each of said columns, control circuits for determining a selective single output path of any said control signals in accordance with selective value settings of said storage members, punching devices for recording the successive digit values read out of said storage devices as corresponding digit value perforations in successive columns of a record member each of said columns comprising a plurality of channels, circuit control means including a relay member activated by an initial selected unitary control signal readout impulse corresponding to a value of greater significance than nine, and wherein said initial readout unitary control signal impulse effects operation of the said punch devices in accordance with a selected first portion of said value for effecting coded representation of said first portion in a given column of the record member, and circuit means controlled by said relay member for determining a subsequent impulse signal from said sequence switch whereby to record in a subsequent column of the record form during a succeeding operation of the punching devices a coded value representing an entry for comprising the complete said selected value greater than nine read out by said initial unitary control signal impulse signal from said single order column of said value storage members.

9. In a data processing system; a control machine having columns of storage members movable to selective control positions representative of different digital values, and wherein one of said members includes at least one control position representative of a plural digit value, means for reading out said columns of said storage members including selective impulse control circuits, means effective in accordance with said control circuits for recording said digital values stored in said members as columns of information on a record member, and means controlled by said one of said storage members according to said one control position thereof representing said plural digit value for recording each of said digits of said plural digit value as a separate column of information on said record member.

10. In a data processing system; a control machine having columns of storage members movable to selective control positions representative of different digital values, and wherein one of said members includes at least one control position representative of a unitary digit value and at least one control position representative of a plural digit value, means for reading out said columns of said storage members including selective control circuits, means effective in accordance with said control circuits for recording a selected unitary digit value stored in said one of said members as a single column of information on a record member, and means controlled by said one of said storage members according to said control position thereof representing said plural digit value for recording each digit of said plural digit value as a separate column of information on said record member.

References Cited in the file of this patent
UNITED STATES PATENTS

| | | |
|---|---|---|
| 2,980,225 | Intagliata et al. | Apr. 18, 1961 |
| 2,983,440 | Wales | May 9, 1961 |
| 3,021,998 | Brewer | Feb. 20, 1962 |